(No Model.)
J. A. HAYTON.
VEHICLE SHAFTS.
No. 366,831. Patented July 19, 1887.
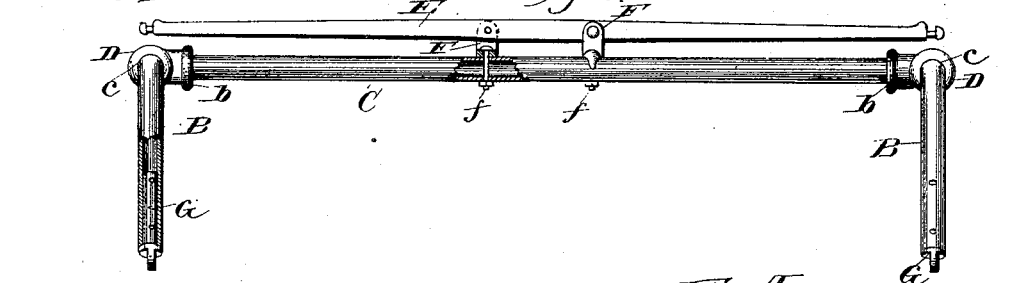
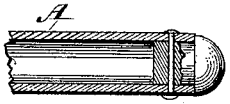
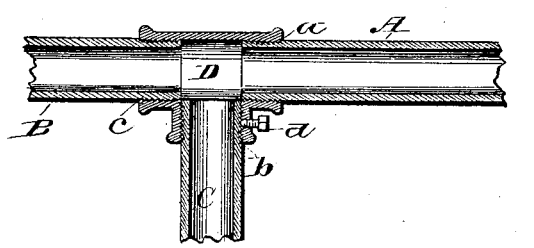
Witnesses:
Inventor:
James A. Hayton
By Stout & Underwood
Attorneys.

UNITED STATES PATENT OFFICE.

JAMES A. HAYTON, OF MILWAUKEE, WISCONSIN.

VEHICLE-SHAFTS.

SPECIFICATION forming part of Letters Patent No. 366,831, dated July 19, 1887.

Application filed February 26, 1887. Serial No. 228,912. (No model.)

*To all whom it may concern:*

Be it known that I, JAMES A. HAYTON, of Milwaukee, in the county of Milwaukee, and in the State of Wisconsin, have invented certain new and useful Improvements in Vehicle Shafts, Poles, &c.; and I do hereby declare that the following is a full, clear, and exact description thereof.

My invention relates to shafts and poles for carriages, and will be fully described hereinafter.

In the drawings, Figure 1 is a plan view of my invention. Fig. 2 is a rear view of the same. Fig. 3 is a horizontal section of the coupling between one of the shafts, its thill, and the cross-piece; and Fig. 4 is a broken section of one of the shafts.

A A are the shafts, and B the thills, which are of tubular metal.

C is the cross-piece, which is also of tubular metal, and D are couplings into which the rear ends of the shafts are screwed at $a$, while one end of the cross-piece is screwed into this coupling at $b$, and the thill for that shaft is screwed into this coupling at $c$; and $d$ is a set-screw which is passed through the portion $b$ of the coupling and impinges upon the cross-piece to prevent the shaft from tipping thereon.

E is the singletree, which is preferably made of spring-steel, and F are clips by which the singletree is secured to the cross-piece. I use two of these clips, as I do not wish the singletree to have any pivotal action, as the elasticity of the singletree will give the necessary yield to the ends of the singletree for equalization. The clips are secured to the cross-piece C by bolts $f$, passed through the latter and secured by suitable nuts.

The shackles G, by which the shafts are connected to the running-gear, consist of bolts which fit into the rear ends of the thills, and are there secured by cross-bolts or rivets having ears for receiving the shackle-bolts.

It is obvious that my invention will apply equally as well to a single pole as to shafts.

Shafts made according to my invention may be either painted or plated, and may be made in any design consistent with their structure.

Having thus fully described my invention, what I claim as new, and desire to secure by Letters Patent, is—

1. The combination of shafts of tubular metal with a cross-piece and tubular couplings connecting the shafts with the cross-piece, and an elastic singletree rigidly secured to the cross-piece, as set forth.

2. The combination of tubular shafts and thills with a tubular cross-piece and tubular couplings for connecting them, and an elastic singletree rigidly secured to the cross-piece, as set forth.

In testimony that I claim the foregoing I have hereunto set my hand, at Milwaukee, in the county of Milwaukee and State of Wisconsin, in the presence of two witnesses.

JAMES A. HAYTON.

Witnesses:
S. S. STOUT,
MAURICE F. FREAR.